United States Patent [19]

Nakamura

[11] Patent Number: 5,033,097

[45] Date of Patent: Jul. 16, 1991

[54] CHARACTER RECOGNITION METHOD

[75] Inventor: Masahiro Nakamura, Yokohama, Japan

[73] Assignee: Ricoh Company, Ltd., Japan

[21] Appl. No.: 259,134

[22] Filed: Oct. 18, 1988

[30] Foreign Application Priority Data

Oct. 26, 1987 [JP] Japan .................................. 62-270013

[51] Int. Cl.$^5$ .............................................. G06K 9/34
[52] U.S. Cl. .......................................... 382/9; 382/18; 382/30; 382/48
[58] Field of Search ..................... 382/9, 12, 48, 18, 30

[56] References Cited

U.S. PATENT DOCUMENTS

| | | | |
|---|---|---|---|
| 4,635,290 | 2/1987 | Tsuji et al. ............................. | 382/48 |
| 4,654,873 | 3/1987 | Fujisawa et al. ...................... | 382/30 |
| 4,811,412 | 3/1989 | Katsurada ............................. | 382/47 |
| 4,847,912 | 7/1989 | Tanaka et al. ......................... | 382/9 |
| 4,959,868 | 9/1990 | Tanioka ................................. | 382/9 |

Primary Examiner—Leo H. Boudreau
Attorney, Agent, or Firm—Mason, Fenwick & Lawrence

[57] ABSTRACT

A character recognition method includes the following steps. The first step is a step of provisionally selecting a segment position for dividing a character line image into image parts within a character recognition processing section in accordance with a condition with respect to widths of black and white regions exhibited in a vertical projection of the character line image within the character recognition processing section. The second step is a step of dividing the character line image into image parts at the segment position to thereby extract the image parts. The third step is a step of subjecting each of the image parts to character recognition. The fourth step is a step of determining an optimum segment position in accordance with results of character recognition. The fifth step is a step of outputting a result of character recognition associated with the optimum segment position.

9 Claims, 8 Drawing Sheets

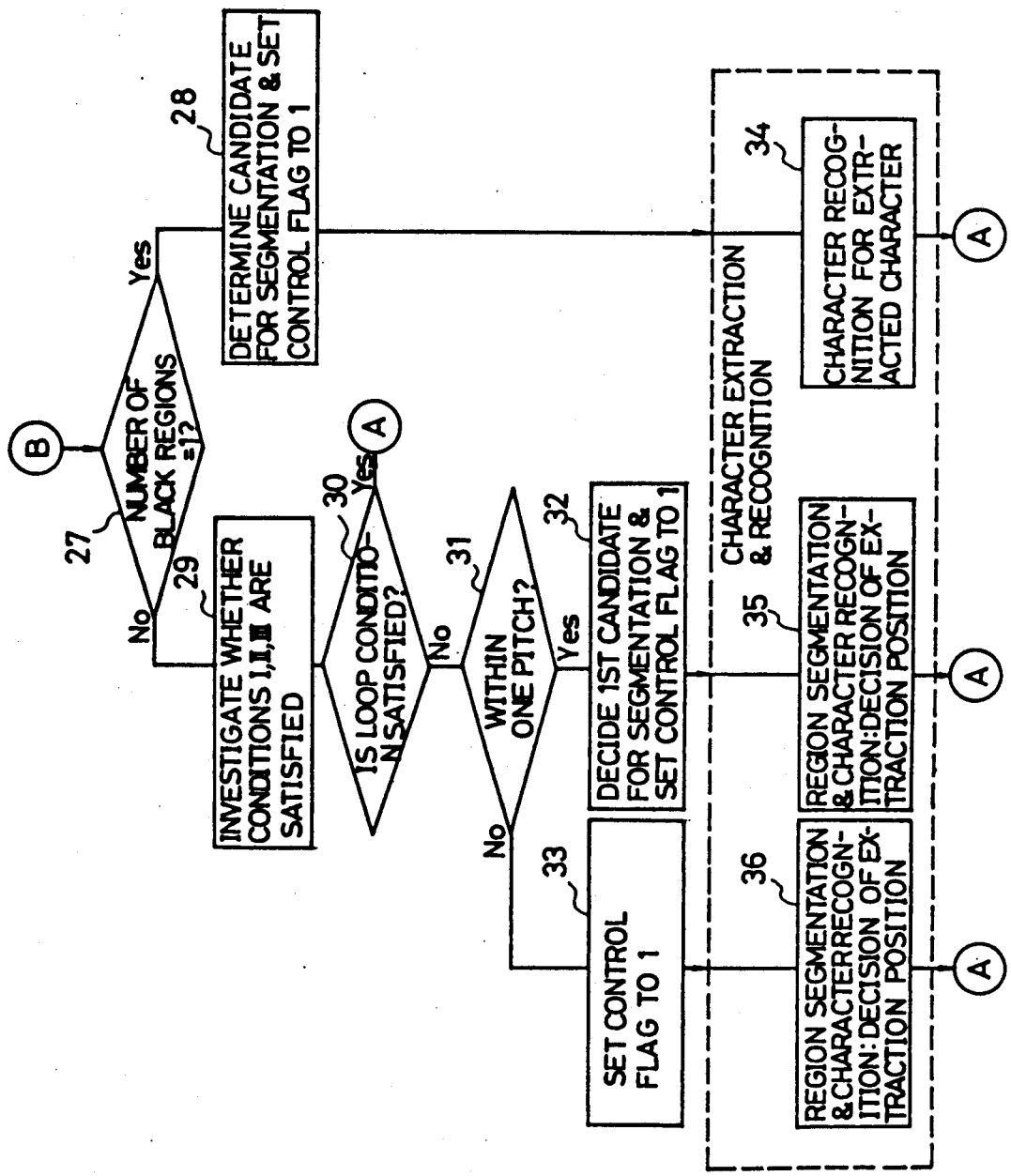

FIG. 8
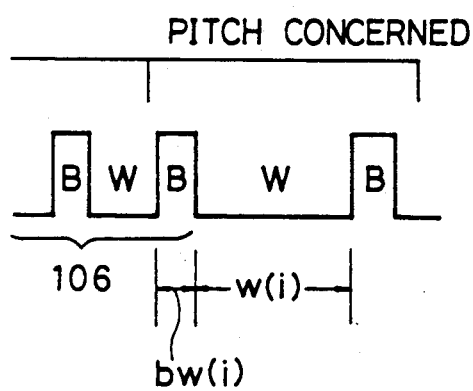
FIG. 9
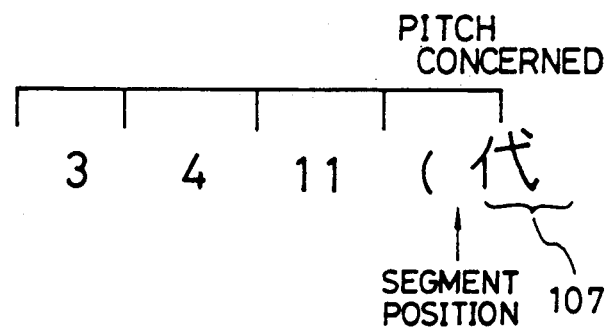
FIG. 10
中 央 研 究 所

CHARACTER RECOGNITION METHOD

BACKGROUND OF THE INVENTION

The present invention generally relates to a character recognition method, and more particularly to a character recognition method capable of correctly identifying characters which are arranged on a document with an undefined character pitch.

Generally, in an optical character reader, image data read from a document are segmented into image data of individual character lines by horizontal projection of the image data. Then each of the segmented character line images is segmented into individual character images in accordance with a fixed character pitch.

However, the above segmentation cannot correctly segment a character line image into individual character images in case where two or more characters are contained in one pitch or one character extends outside the one pitch. These problems cause a decrease in a character recognition rate, particularly for a document on which characters are arranged with an undefined character pitch, such as a name card and a magazine. Further, the use of the conventional segmentation is limited to a specific document in which characters are arranged a fixed character pitch.

SUMMARY OF THE INVENTION

Accordingly, a general object of the present invention is to provide a character recognition method in which the disadvantages of the conventional character recognition method are eliminated.

A more specific object of the present invention is to provide a character recognition method capable of correctly identifying characters which are arranged on a document with an undefined character pitch.

The above objects of the present invention are achieved by a character recognition method which includes the following steps. The first step is a step of extracting an image of a character line including a plurality of characters from an image of a document. The second step is a step of extracting vertical projection from the character line image. The third step is a step of provisionally selecting a segment position for dividing the character line image into image parts within a character recognition processing section in accordance with a condition with respect to widths of black and white regions exhibited in the vertical projection within the character recognition processing section. The fourth step is a step of dividing the character line image into image parts at the segment position to thereby extract the image parts. The fifth step is a step of subjecting each of the image parts to character recognition. The sixth step is a step of determining an optimum segment position in accordance with results of character recognition. The seventh step is a step of outputting a result of character recognition associated with the optimum segment position.

Other objects, features and advantages of the present invention will become apparent from the following detailed description when read in conjunction with the accompanying drawings.

BRIEF DESCRIPTION OF THE DRAWINGS

FIGS. 4A and 4B are flowcharts of an operation of the embodiment of FIG. 3;

FIG. 8 is a view showing vertical projection for explaining condition III;

FIG. 9 is a view showing a character string for explaining condition III;

FIG. 10 is a view showing a character string for explaining character extraction and recognition of the embodiment in a case where a control flag is set to 0;

DETAILED DESCRIPTION

Figure 1:
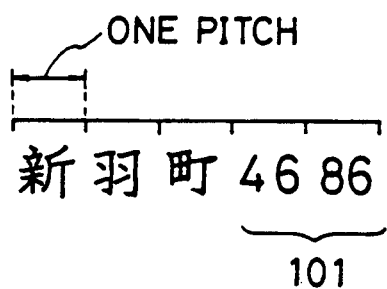
FIG. 1 is a view for explaining problems of a conventional character recognition method.
Figure 2:
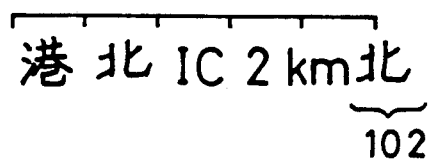
FIG. 2 is another view for explaining problems of a conventional character recognition method.

To facilitate the understanding of the present invention, a description is now given of disadvantages of the aforementioned conventional character recognition method with reference to FIGS. 1 and 2.

As described previously, image data read from a document is segmented into image data of individual character lines by extracting horizontal projection of the image data. Then each of the segmented character line images is segmented into individual character images in accordance with a fixed character pitch.

However, as shown in FIG. 1, with the above segmentation, it is not possible to correctly segment a character line image into respective character images in a case where two or more characters are contained within one pitch, as indicated by a reference numeral 101. As shown in FIG. 2, in case where one character extends outside one pitch, as indicated by a reference numeral 102, with the conventional segmentation, it is not possible to correctly segment the character line image. These problems cause a decrease in a character recognition rate, particularly for a document on which characters are written with an undefined character pitch, such as a name card and a magazine. Further, the use of the conventional segmentation is limited to a specific document such that characters are arranged with a fixed character pitch.

The present invention intends to overcome the above problems.

A description is given of a preferred embodiment of the present invention.

Figure 3:
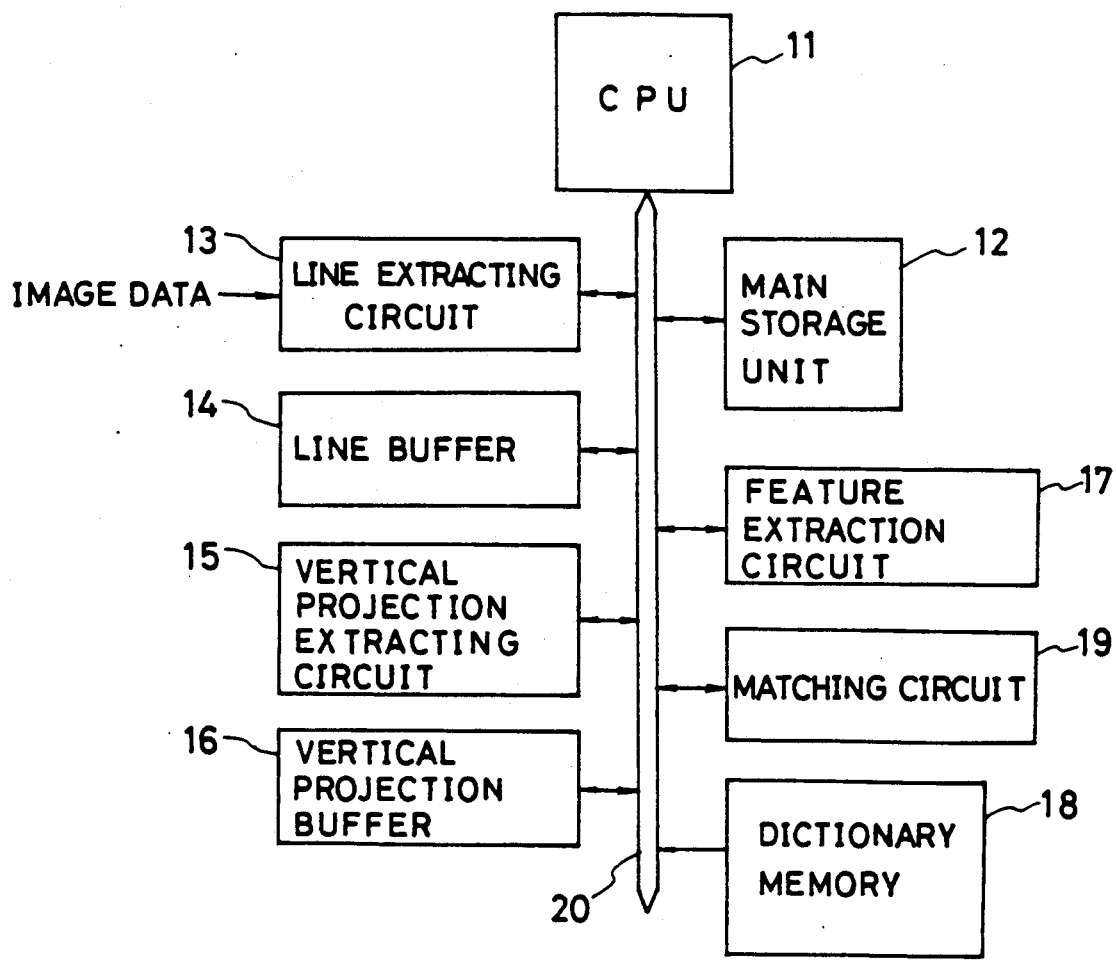
FIG. 3 is a block diagram of a preferred embodiment of the present invention.

Referring to FIG. 3, a central processing unit 11 (hereinafter simply referred to as a CPU) controls illustrated components and executes a data processing described later. A main storage unit 12 stores programs for controlling the CPU 11, and data which are processed in the embodiment. A line extracting circuit 13 extracts horizontal projection of binary image data from image data of a document which is obtained by optically scanning the document. Then the line extracting circuit 13 extracts, as a character line, a region surrounded by a region consisting of white data. The extracted character line image is stored in a line buffer 14.

A vertical projection extracting circuit 15 extracts vertical projection in a direction perpendicular to the character image line. Binary data of the vertical projection, or vertical projection data is stored in a vertical projection buffer 16. The vertical projection data may be obtained by performing a conjunction (AND) operation with respect to pixel data arranged in the vertical direction. Alternatively, the vertical projection data may be obtained as follows. A number of black pixels arranged in the vertical direction is counted. If a counted number of black pixels is equal to or greater than a specific value, a region which includes those black pixels is determined to be a black region. On the other hand, if the counted number of black pixels is smaller than the above specific value, a region which includes those black pixels is determined to be a white region.

A feature extraction circuit 17 extracts a feature of the extracted character image. A dictionary memory 18 stores a recognition dictionary. A matching circuit 19 carries out matching between a feature of the reference dictionary and the extracted feature. As shown in FIG. 3, the above-mentioned components are connected to a bus 20.

Figure 4A:
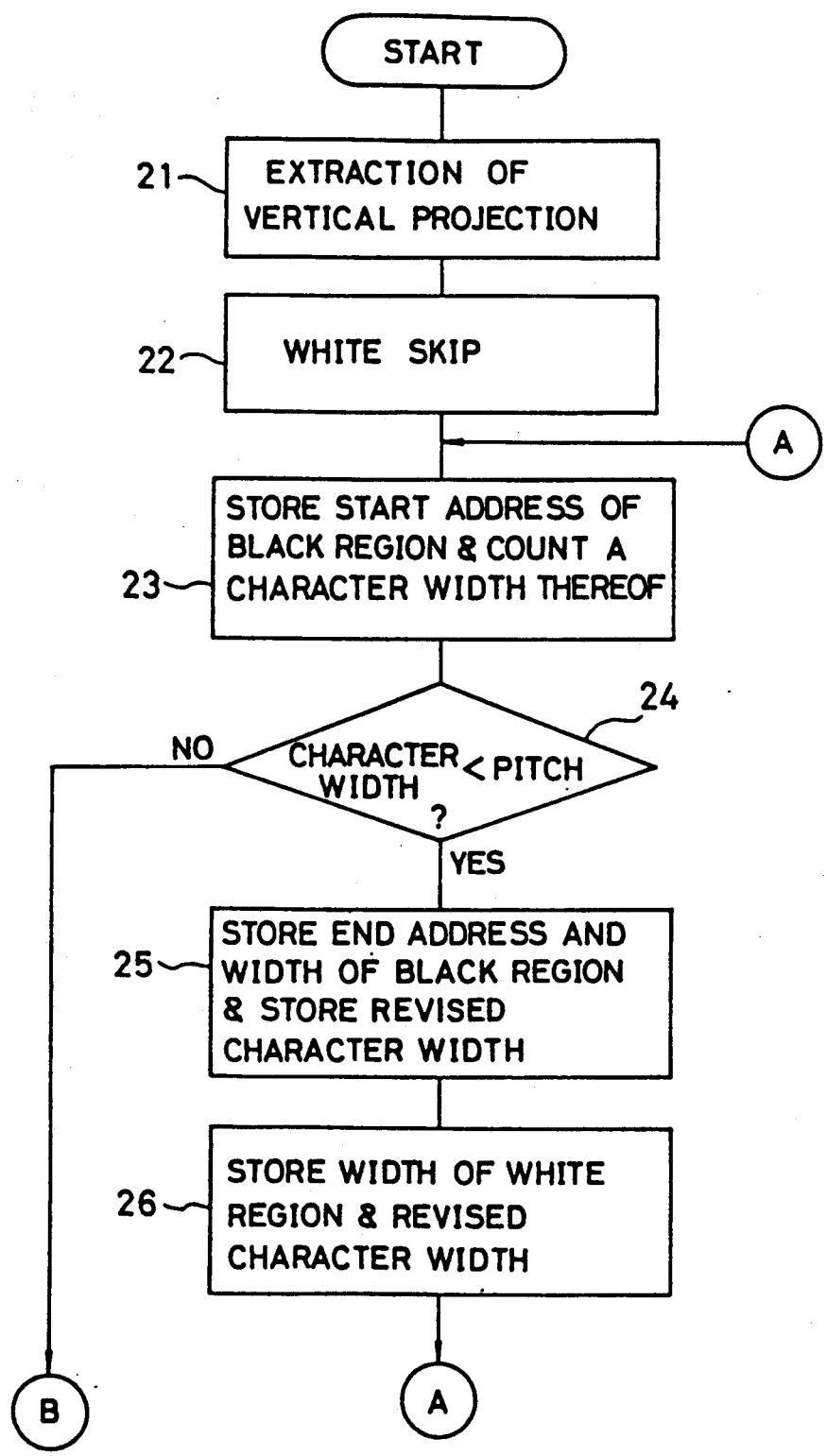

A description is given of an operation of the embodiment after a character line image is segmented from the document image stored in the main storage unit 12, with reference to a flowchart of FIGS. 4A and 4B.

When the extraction of the character line image in the line extracting circuit 13 ends, the CPU 1 activates the vertical projection extracting circuit 15 in accordance with a related program stored in the main storage unit 12. Then, the vertical projection extracting circuit 15 extracts vertical projection of the character line image stored in the line buffer 14 (step 21 of FIG. 4A). After step 21, the CPU 11 sequentially investigates the vertical projection data stored in the vertical projection buffer 16, starting from the beginning of the vertical projection data, and skips a white region until a first black region is found (step 22).

The CPU 11 stores a start address of the first black region into the main memory unit 12, and counts a width of the first black region (step 23). Then the CUP 11 compares the sum of the counted width and a character width (initially set to zero) which is stored in the main storage unit 12, with a pitch (step 24). This pitch may be predetermined or may be calculated from a height of the extracted character line image.

In a case where the character width is smaller than the pitch, an end address and a width of the above black region are stored in the main storage unit 12 (step 25). Further, the current character width which is being stored in the main storage unit 12 is replaced with the sum of the width of the above black region and the above current character width (step 25), whereby the character width is revised or updated. Next, a width of a white region which is interposed between said black region and a next black region is counted, and a counted width of the white region is stored in the main storage unit 12 (step 26). Further, the above counted width is added to the character width which is currently stored in the main storage unit 12. Then the character width being stored in the main storage unit 12 is substituted with an added result (step 26), and thereby the character width is revised or updated. Then the procedure returns to step 23.

A loop consisting of steps 23 to 26 is repetitively carried out until step 24 discriminates that the character width becomes equal to or greater than the pitch. Then when the discrimination result is YES, the procedure leaves the loop and proceeds to step 27 shown in FIG. 4B. In step 27, it is discriminated whether or not a number of black regions to be processed is equal to one. In case where only one black region exists, the black region can be extracted as it is as one character. Therefore, a region between the start and end addresses of the black region is stored, as a candidate for segmentation or character extraction, in the main storage unit 12 (step 28). At the same time, a control flag provided in the main storage unit 12 is set to 0 (step 28). In a case where there are two or more black regions, the procedure proceeds to step 29, where it is checked whether the following three conditions I, II and III are satisfied.

Condition I

Condition I represents a case when a width of a black region within a pitch of concern is smaller than a threshold value THB of a black region width, and a width of a white region which follows the above black region is smaller than a threshold value THW of a white region width.

Figure 5A:
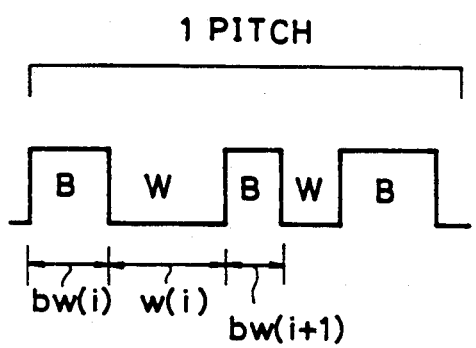
FIGS. 5A through 5C are views showing vertical projection for explaining condition I.
Figure 5B:
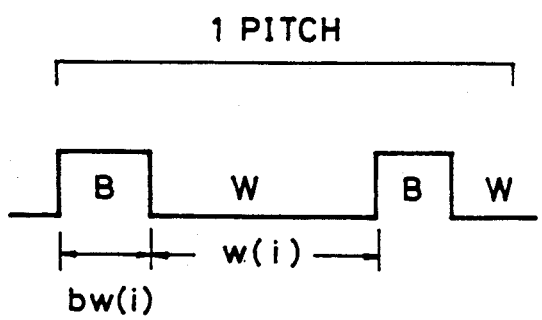
Figure 5C:
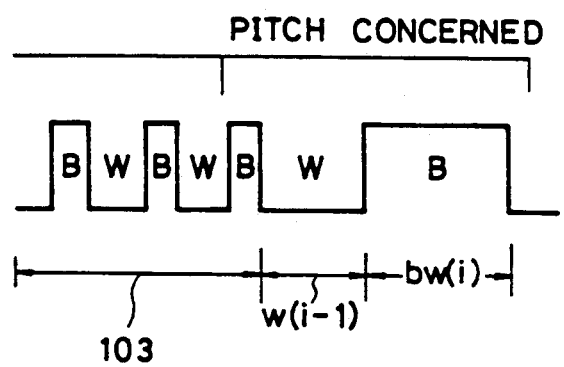

When vertical projection as shown in FIGS. 5A and 5B is obtained, it is discriminated whether or not bw(i)<THB and at the same time w(i)<THW, where bw(i) denotes a width of a black region within a pitch of concern and w(i) denotes a width of a white region. The case of FIG. 5A is a case where the condition I is satisfied. For example, a Chinese character pronounced as "KAWA" shown in FIG. 5C may satisfy the condition I. In this case, all the separated black regions within one pitch must be extracted as one character. On the other hand, the case of FIG. 5C is a case where the condition I is satisfied, or in other words, the white region width w(i) is greater than the white region threshold width THW. For example, neighboring numerals "11" of a numeral string "6111" as in a telephone number may not satisfy the condition I. That is, there is a probability that numerals "11" are located within one pitch. In this case, numerals "1" and "1" must be separately extracted by segmenting the one-pitch region at a boundary of a white region interposed between numerals "1" and "1".

Condition II

The condition II defines a case when i) a black region of concern has a width equal to or greater than the black region threshold width THB, and ii) a white region which precedes the black region of concern has a width equal to or greater than the white region threshold width THB, and iii) there is a black region which is located prior to the black region of concern and which does not satisfy the condition I (or in other words, the character extraction (image or region segmentation) and character recognition process is not completed with respect to one pitch or more prior to the pitch of concern).

Figure 6:
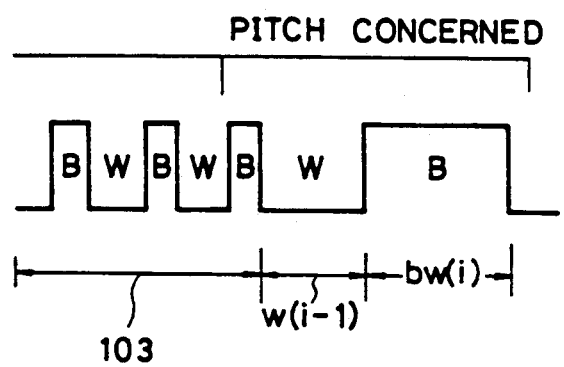
FIG. 6 is a view showing vertical projection for explaining condition II.

In vertical projection of FIG. 6, a black region of concern has a width bw(i) equal to or greater than the black region threshold width THB. A white region has a width w(i−1) equal to or greater than the black region threshold width THB. Prior to the black region having the width bw(i), there is a region which contains three black regions indicated by a numeral 103 and which does not satisfy the condition I.

Figure 7:
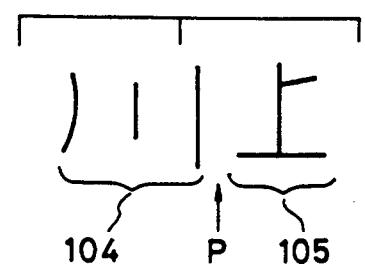
FIG. 7 is a view showing a character string for explaining condition II.

A character string shown in FIG. 7 is processed in accordance with the condition II. A Chinese character 104 extends over a distance greater than one pitch. This Chinese character 104 must be extracted as one character by segmenting the illustrated line image into two parts at a boundary P (an optimum segment position) which is a white region. On the other hand, a Chinese character 105 is extracted as one character.

Condition III

Condition III defines a case when the width of a white region within the pitch of concern is equal to or greater than the white region threshold width THW and a black region exists which satisfies the condition I, and a position at which the line image is to be segmented has not yet been decided.

For example, in vertical projection of FIG. 8, the width w(i) is equal to or greater than the white region threshold width THW. A region 106 satisfies the condition I and a segment position of the region 106 has not yet been decided. A character string of FIG. 9 corresponds to the case of FIG. 8. In the illustrated case, "(" must be extracted separately from a Chinese character 107.

In step 30 subsequent to step 29 of FIG. 4, it is discriminated whether only the condition I is satisfied, and the conditions II and III are not satisfied. If the discrimination result is YES, the procedure does not proceed to the character extraction and recognition process, and returns to the loop consisting of steps 23 to 26. In this case, the count operation of a character width restarts from zero. Then the next pitch starts from a black region next to the last white region which is contained in the pitch prior to the aforementioned next pitch. Then if the procedure leaves the loop, a process which starts from step 29 is performed with respect to not only the pitch being processed (the pitch of concern) but also the previous pitch in which the character extraction and recognition process has not yet been completed.

In step 30, if the condition for returning to step 23, or a loop conditions are not satisfied, it is discriminated in step 31 as to whether or not the character extraction process is being carried out for a range within one pitch of concern. If the character extracting process is being carried out for a range within one pitch, a region is extracted which starts from the start address of the first black region and ends with an end address of a black region just prior to a white region which is the widest of white regions contained in one pitch of concern. The extracted black region thus processed is the first candidate for character extraction (image segmentation). The start and end addresses of the first candidate are stored in the main storage unit 12, and the aforementioned control flag is set to 1 (step 32). If the character extracting process is carried out for a character which extends over a region greater than one pitch, the control flag is set to 2 (step 33).

After the control flag is set, one of the steps 34, 35 and 36 is executed in accordance with the status of the control flag.

In the case where the control flag is set to 0 in step 28, step 34 is carried out. In step 34, there is only one candidate for character extraction, and therefore the CPU 1 reads out an image between the start and end addresses of the candidate from the data stored in the column buffer 14. The extracted image is transferred to the feature extraction circuit 17, which is then activated. The feature extraction circuit 17 carries out the feature extraction operation with respect to the transferred candidate, and sends an extracted feature of the candidate to the matching circuit 19. When the CPU 11 is informed of the end of the feature extraction operation, the CPU 11 activates the matching circuit 19. The matching circuit 19 sequentially enters contents of the dictionary from the dictionary memory 18, and then performs matching between the extracted feature and the dictionary. Then the matching circuit 19 selects a candidate for the extracted character. Then a code of the candidate is stored in an output buffer (not shown) in the main memory unit 12 by the control of the CPU 11.

For example, the control flag is set to 0 when a character string of FIG. 10 is processed. After step 34, the respective Chinese characters are separately extracted, and are subjected to character recognition.

In the case where the control flag is set to 1 in step 32, that is, the segmentation is possible within one pitch, step 35 is performed. In step 35, an image within a range between the start and end addresses of the first candidate is extracted from the data in the line buffer 14. The extracted image is then subjected to the feature extraction and recognition process. Then a plurality of candidates for the extracted unknown character such as the first and second candidates may be determined. Then the degree of difference (distance) between the dictionary and each of the first and second candidates is stored in the main storage unit 12 together with codes of the first and second candidates. The CPU 11 ends the feature extraction and recognition process if a degree of similarity of the first candidate is equal to or greater than a predetermined reference value. Then the CPU 11 stores the code of the first candidate into the output buffer provided in the main storage unit 12. The degree of similarity of a candidate can be represented on the basis of a distance between the first candidate and the dictionary, or a combination of the above distance and a difference in distance between the first and second candidates.

On the other hand, if the degree of similarity of a character formed by the first candidate for character extraction or segmentation (hereinafter referred to as the first candidate-character), is smaller than the predetermined value, k black regions are investigated. In this case, a character formed by the first black region which first appears within the one pitch of concern, is extracted as the first character, and a character formed by the remaining (k−1) black regions is extracted as the second character. Then the two separately extracted characters are subjected to character recognition. Next, a character formed by the first and second black regions is extracted, and a character formed by the remaining (k−2) black regions is extracted. Then the two extracted characters are subjected to character recognition. In this manner, a region which contains k black regions is divided into two regions, and character recognition is carried out for each of the characters which are formed by the respective segmented regions. Finally, a character formed by the first (k−1) black regions and a character formed by the remaining one region (last region) are extracted, and are then subjected to character recognition.

After character recognition, the most probable candidate-character is extracted from among the candidate-characters. Then, a candidate-character which is paired with the most probable candidate-character is selected. Then the degree of similarity of the most probable candidate-character and the degree of similarity of the other candidate of the pair are respectively compared with the degree of similarity of the aforementioned first candidate-character which is obtained by the first black region. If both the degrees of similarity exceed the degree of similarity of the first candidate-character, codes of the paired candidate-characters are stored, as recognition results, in the output buffer in the main storage unit 12.

Figure 11A:
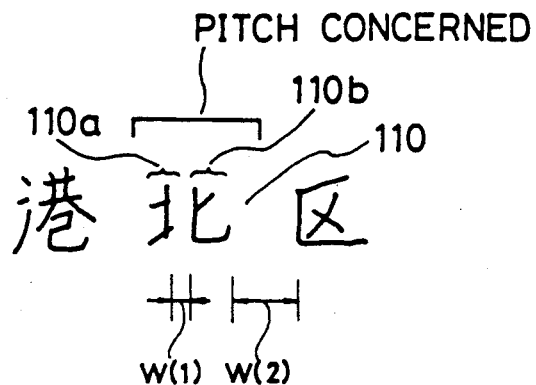
FIG. 11A through 11C are views showing character strings for explaining character extraction and recognition of the embodiment in a case where the control flag is set to 1.
Figure 11B:
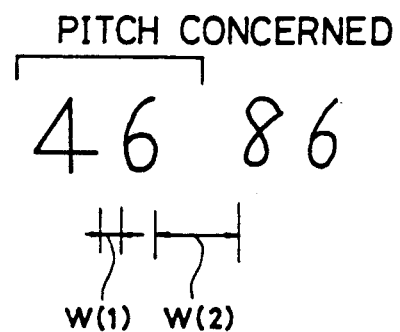
Figure 11C:
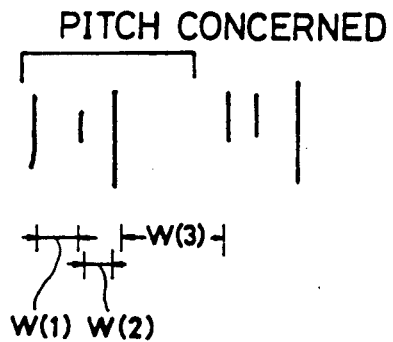

A detailed example is shown in FIGS. 11A through 11C. In an example of FIG. 11A, the first candidate-character for character extraction is a Chinese character indicated by a numeral 110, because $w(1)<w(2)$. When a degree of similarity of the Chinese character 110 is equal to or greater than the predetermined reference value, the Chinese character 110 is correctly extracted. On the other hand, when the degree of similarity of the Chinese character 110 is smaller than the predetermined reference value, left-hand and right-hand parts 110a and 110b of the Chinese character are separately extracted. In this case, if both the degrees of similarity of the left-hand and right-hand parts 110a and 110b are equal to or greater than the degree of similarity of the Chinese character 110, the left-hand and right-hand parts 110a and 110b are determined as separate or individual characters.

In an example of FIG. 11B, if $w(1)<w(2)$, a numeral "46" is extracted as one character, and is then subjected to character recognition. The degree of similarity of the numeral "46" would be definitely low, and therefore numeral "46" is divided into "4" and "6". If $w(1)>w(2)$, only "4" is subjected to character recognition.

In an example of FIG. 11C, a region prior to the position of a white region of the width $w(3)$ is extracted and is then subjected to character recognition. If the degree of similarity of the character (the first candidate-character) in the above region is lower than the predetermined value, the region is divided into two parts at a boundary of a white region having the width $w(1)$. Also, the above region is divided into two parts at a boundary of a white region having the width $w(2)$. Then degrees of similarity of the divided regions of each pair are compared with the degree of similarity of the first candidate-character. Then a candidate for the unknown character is identified.

In a case where the control flag is set to 2 in step 33, step 36 is executed. A process in step 36 is described in detail below with reference to FIGS. 12A through 12C which show vertical projections.

Figure 12A:
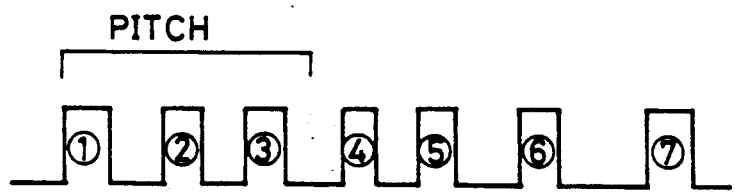
FIG. 12A through 12C are views showing character strings for explaining character extraction and recognition of the embodiment in a case where the control flag is set to 2.
Figure 12B:
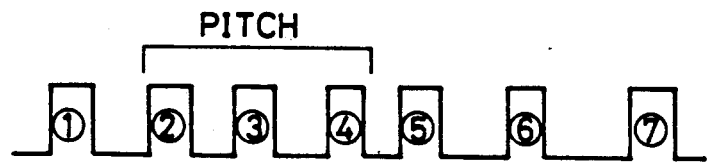
Figure 12C:
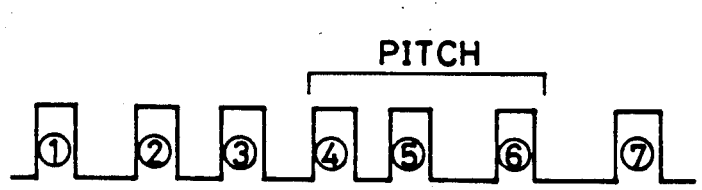

As shown in FIG. 12A, black regions ①, ② and ③ are processed. The regions ①, ② and ③ are located within a width of one pitch which starts from the start address of the black region ①. First, an image of the black region ① is extracted as a character, and is then subjected to character recognition. Next, an image formed by the black regions ② and ③ is extracted as a character, and is then subjected to character recognition. Then, an image formed by the black regions ①, ② and ③ is extracted and is then subjected to character recognition. Finally, the most probable character is identified.

For example, if the black region ① has the image of the most probable character, black regions ②, ③ and ④ are extracted which may be contained in a width of one pitch starting from the start address of the black region ②. Then the same process as the above-mentioned process is carried out for the regions ②, ③ and ④. Then if the image formed by the black regions ② and ③ forms the most probable character, black regions ④, ⑤ and ⑥ are extracted, and an image formed by the black regions ④, ⑤ and ⑥ is then subjected to the same process.

After the character extraction and recognition process ends, black and white regions which have been processed in the aforementioned manner are deleted from the main storage unit 12. Then a subsequent black region is processed starting from step 23.

It can be seen from the above detailed description that the present invention is capable of separately extracting characters which are contained in a character line with an undefined pitch. Therefore, the accuracy of character recognition can be improved.

The present invention is not limited to the embodiments, and variations and modifications may be made without departing from the scope of the present invention.

What is claimed is:

1. A character recognition method, comprising the steps of:

extracting a character line image including images of a plurality of characters from an image of a document;

extracting a vertical projection of said character line image therefrom, said vertical projection showing a distribution of black and white regions as a function of position along said character line image;

provisionally selecting a segment position for dividing said character line image into image parts within a character recognition processing section in accordance with a condition with respect to widths of said black and white regions contained int he vertical projection within said character recognition processing section;

dividing the character line image into image parts at said segment position to thereby extract the image parts;

recognizing each of the image parts and a combination of said image parts by comparing them with reference characters;

determining an optimum segment position so that image parts of said character line image divided by said optimum segment position respectively have highest degrees of similarity; and outputting a result of a character recognition in which said image parts of said character line image divided by the optimum segment position are recognized.

2. A character recognition method as claimed in claim 1, wherein the step of provisionally selecting the segment position further comprises a step of discriminating whether only one black region is included in the character recognition processing section in accordance with said condition, and wherein when the character recognition processing section has only one black region, the image of said one black region is extracted from the character line image and is then subjected to character recognition.

3. A character recognition method as claimed in claim 1, wherein the step of provisionally selecting the segment position further comprises a step of discriminating whether only one black region is included in the character recognition processing section in accordance with said condition, and wherein when the character recognition processing section has more than one black region, the step of provisionally selecting the segment position determines the segment position by discriminating whether or not a white region interposed between neighboring black regions is a separation between characters formed by the respective black regions.

4. A character recognition method as claimed in claim 1, wherein in a case where a width of a black region contained in the character recognition processing section is smaller than a predetermined threshold value of a black region width, and a width of a white region which follows said black region is smaller than a predetermined threshold value of a white region width, the step of provisionally selecting the segment position determines that said white region is not a separation of neighboring characters and provisionally selects the segment position so as to extract said black region together with said white region which follows said black region.

5. A character recognition method as claimed in claim 1, wherein in a case where each black region contained in the character recognition processing section has a width smaller than a predetermined threshold value of a black region, and each white region contained therein has a width smaller than a predetermined threshold value of a white region width, the step of provisionally selecting the segment position determines that only one character which is formed by black regions is contained in the character recognition processing section, and provisionally selects the segment position which enables said only one character to be extracted from the character image line.

6. A character recognition method as claimed in claim 1, wherein in a case where a white region contained in the character recognition processing section has a width equal to or greater than a predetermined threshold value of a white region width, the step of provisionally selecting the segment position provisionally selects said white region as a separation which separates neighboring characters.

7. A character recognition method as claimed in claim 1, wherein in a case where the character recognition processing section has a plurality of black regions, the step of provisionally selecting the segment position provisionally selects each white region interposed between neighboring black regions out of said plurality of black regions as a separation which divides the image data in the character recognition processing section into two image parts which are paired.

8. A character recognition method as claimed in claim 7, wherein in a case where the character recognition processing section corresponds to a region greater than a predetermined pitch, the character recognition step carries out character recognition for each of the paired image parts obtained for every segment position, and wherein the step of determining the optimum segment position determines, as the optimum segment position, one of the segment positions at which the most probable recognition result is obtained.

9. A character recognition method as claimed in claim 7, wherein in a case where the character recognition processing section corresponds to a region within a predetermined pitch, the character recognition step carries out character recognition for a character formed by all the image parts contained in said pitch and for each of the paired image parts obtained for every segment position, and wherein the step of determining the optimum segment position determines, as the optimum segment position, a segment position at which the image contained in said pitch is extracted as it is, in a case where a recognition result with respect to said character formed by all the image parts is more probable than other recognition results, and in other cases, the step of determining the optimum segment position determines, as the optimum segment position, one of the segment positions at which the most probable recognition result is obtained.

* * * * *